United States Patent [19]

Hill et al.

[11] Patent Number: 4,724,036

[45] Date of Patent: Feb. 9, 1988

[54] PROGRESSIVELY PORTED VACUUM DRUM FOR LABELING MACHINES

[75] Inventors: James A. Hill, Toledo; Terry C. Potter, Sylvania, both of Ohio

[73] Assignee: Owens-Illinois Plastic Products Inc., Toledo, Ohio

[21] Appl. No.: 831,682

[22] Filed: Feb. 21, 1986

[51] Int. Cl.[4] ........................ B32B 31/00; B65C 9/00; B65C 11/04

[52] U.S. Cl. .................................... 156/497; 156/521; 156/567; 156/578; 156/DIG. 35

[58] Field of Search ............... 156/354, 567, 568, 578, 156/DIG. 34, DIG. 35, 521, 540, 541, 542, 539, 510, 361, 267, 230, 249, 356, 497, 531

[56] References Cited

U.S. PATENT DOCUMENTS

| | | | |
|---|---|---|---|
| 4,108,710 | 8/1978 | Hoffmann | 156/521 |
| 4,111,738 | 9/1978 | Amberg | 156/521 |
| 4,123,310 | 10/1978 | Varon | 156/361 |
| 4,181,555 | 1/1980 | Hoffmann | 156/267 |
| 4,242,167 | 12/1980 | Hoffmann | 156/521 |
| 4,323,416 | 4/1982 | Malthouse et al. | 156/521 |
| 4,561,928 | 12/1985 | Malthouse | 156/510 |

*Primary Examiner*—Jerome Massie
*Assistant Examiner*—Louis Falasco
*Attorney, Agent, or Firm*—H. G. Bruss

[57] ABSTRACT

A vacuum drum for carrying a label held to its surface by vacuum past an adhesive applying roll to a position where the label will touch a container and the container will be rolled along the drum surface to thereby apply the label about the container. The drum is provided with a circumferential series of vacuum ports that extend through its outer surface. The vacuum to the ports is fed through passages in a bottom support plate for the drum and the passages all communicate with a stationary vacuum chamber in a collector ring which is held against the inner surface of the drum supporting plate. The collector ring vacuum chamber extends about the axis of the ring for about 180° and at one end thereof serves to close off the passages to the drum in radial succession as the label is transferred to the container. Each passage, after being shut off from the vacuum, is vented. The passages which connect to the label leading edge vacuum ports are connected to an air pressure chamber in the collector ring immediately after being cut off from vacuum to assist in the transfer of the leading edge of the label to the container.

12 Claims, 4 Drawing Figures

PROGRESSIVELY PORTED VACUUM DRUM FOR LABELING MACHINES

The present invention relates to apparatus and method for wrapping labels around a container on a continuous production basis. It has been known to apply labels about containers by moving the containers at spaced intervals into tangential engagement with the outer surface of a label drum which is mounted for rotation about its vertical axis. The drum is designed to carry individual labels which are held to the vertical surface of the drum by vacuum. As the drum carrying the labels rotates about its axis, it picks up a label which is fed to the surface of the drum. The label, which is cut into its proper length, will pass by a glue applicator roll or, more recently, a solvent applicator roll when the label is formed of plastic. The glue, or the solvent, thereby provides an adhesive which will permit the label to adhere to a container at the point of tangency of the container with the drum carrying the label.

The container, when brought into tangency with the drum, is rolled along the surface of the drum, thereby transferring and rolling the label about the container. As the container continues to roll along the drum surface, the label will be wrapped around the circumference of the container. Typically, the label is somewhat longer than the container circumference and thus the trailing edge of the label will overlap the leading edge or that portion of the label which was first adhered to the container. This trailing edge will have glue or solvent thereon and be sealed to and overlap the leading edge to form a complete encircling label on the container with a complete vertical seam. In those instances where the label is of a heat shrinkable plastic this system is well suited to permitting the passage of labeled containers through a heated tunnel which then may shrink the label more tightly to the circumference of the container. In those cases where the label material is made of non-heat sensitive plastic or possibly paper laminates or metal foil, a hot melt adhesive could be used instead of a solvent. Hot melt adhesives have the advantage of quick drying and more importantly provide a much more problem-free operation of a labeling system.

Typically, the drum used for transferring the labels has been formed with a hard, yet somewhat resilient, rubber outer surface with raised vertical portions or areas which correspond to the leading and trailing edges of the label being applied. The typical drum circumference may be divided into three, four or more label accommodating sectors about the circumference thereof. In these instances the raised areas will be spaced such that the leading edge of the label will be spaced from the trailing edge of the preceding label by a gap and the solvent or the hot melt adhesive or any other adhesive will only be applied to the label surface that is overlying the raised areas. This conserves glue or solvent.

As previously stated, the label transporting drum holds the label to its surface by vacuum and it is important that when the container is brought tangentially into engagement with the leading edge of the label carried by the drum that the label transfer to the container and be released from the drum, and that the label roll around the container as the container precesses about the circumference of the drum. It should be understood that the container is held against the drum surface by a curved backup bar having a curvature which is parallel to the outer circumference of the drum. Typically, the containers are transported into the tangential engagement with the drum by a pocketed starwheel which also rotates about a vertical axis which is parallel to the axis of the drum. Once the leading edge of the label comes in contact with the surface of the container or article, it is important that the label be transferred to the article and not slide or slip relatively thereto during the wrapping of the label about the article. As previously mentioned, the drum is one that holds the label to its outer surface by vacuum and it has been a problem in the past when the label is transferred to the article and subsequently wrapped about the article and a progressively increasing number of vacuum ports become exposed and opened to the atmosphere, the amount of available vacuum holding the remainder of that label and other labels on the drum becomes proportionately less. This reduction in available vacuum results in inconsistant handling and mispositioned or misapplied labels, also in some instances the transfer of the label is not properly effected and the vacuum continues to hold the label to its surface rather than permitting the label to transfer, and it is these problems that are specifically addressed by the present invention.

With the foregoing in view, it is an object of the present invention to provide a vacuum drum which allows the vacuum to be turned on only when the label is in contact with the drum and then be turned off as the label leaves the drum during transfer to the article or bottle being labeled.

It is a further object of this invention to significantly reduce vacuum losses and improve handling characteristics of paper, plastic film or metal foil labels by controlling the application of vacuum for holding and releasing the label from the vacuum transfer drum during the entire 360° rotation of the drum.

Other and further objects will become apparent from a reading of the following description taken in conjunction with the annexed sheets of drawings.

DETAILED DESCRIPTION OF THE DRAWINGS

Figure 1:
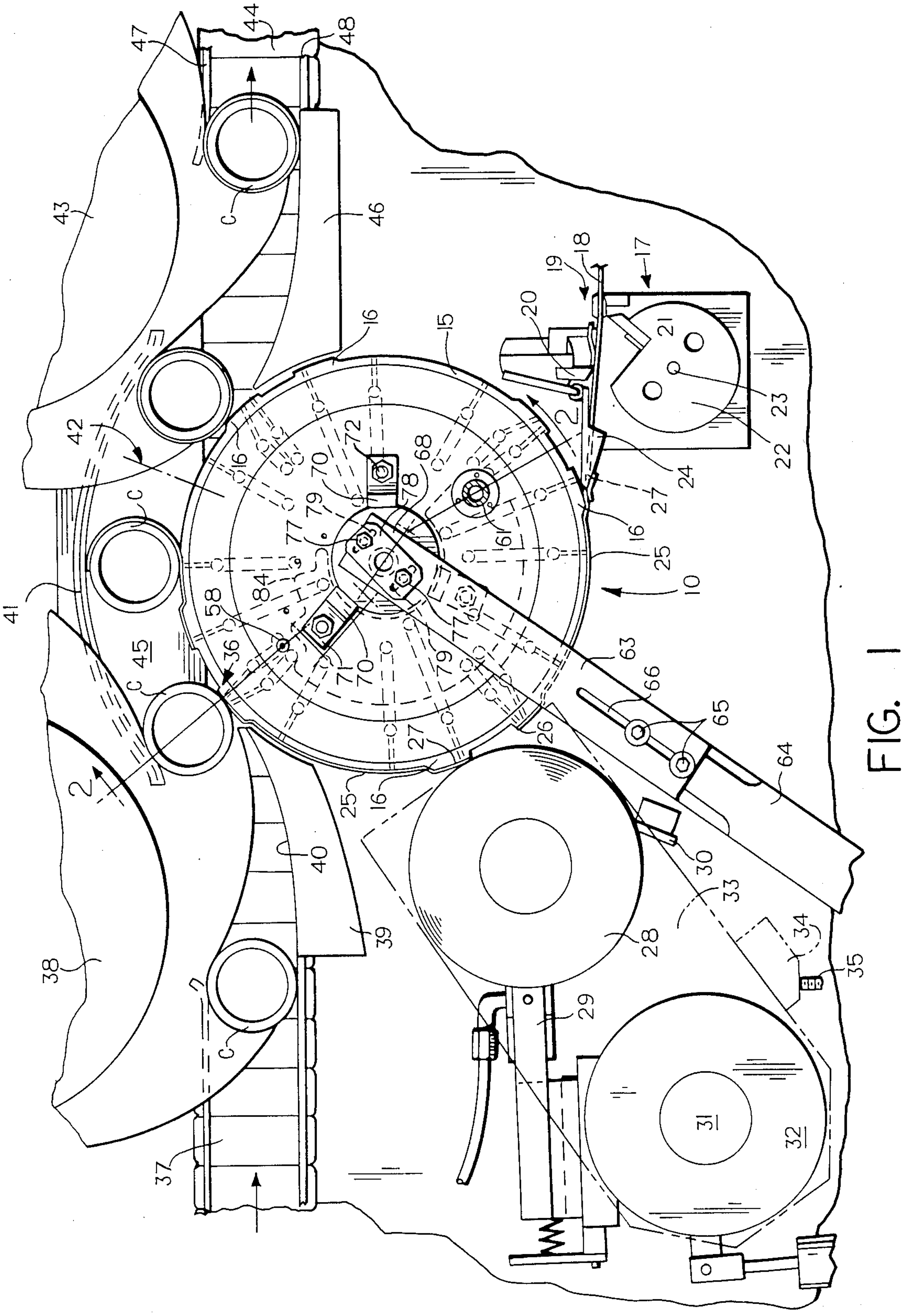
FIG. 1 is a top plan view of the vacuum label transfer drum of the invention with the article handling system.
Figure 2:
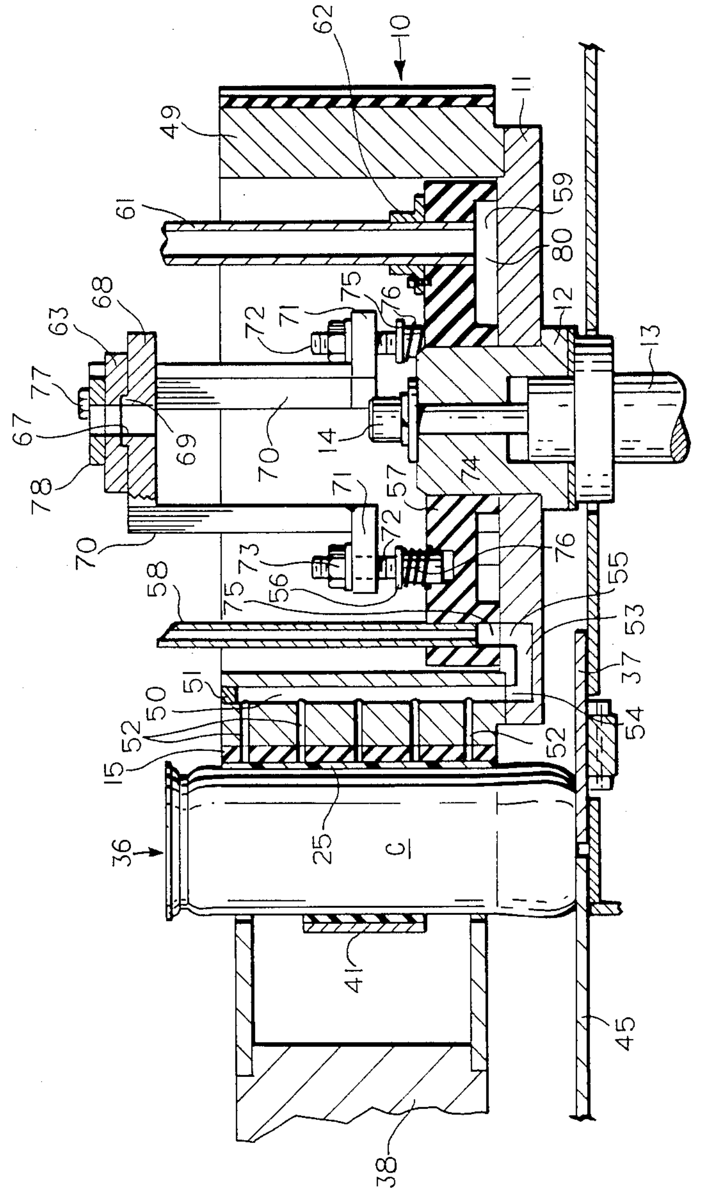
FIG. 2 is a vertical sectional view taken at line 2—2 of FIG. 1.

With particular reference to FIGS. 1 and 2, a general description of the apparatus constituting the invention and its position in the overall apparatus for applying wraparound labels to articles or containers will be provided.

FIG. 1 is a partial plan view of the label applying system incorporating the invention of a label supporting drum generally designated 10 in the form of a generally hollow cylindrical body having its lower end or bottom closed by a circular support plate 11. As best seen in FIG. 2, the support plate 11 is welded to a vertical cylindrical hub 12 which is fixed at the upper end of a drive shaft 13 by a machine bolt 14 which threads into an opening in the drive shaft 13. The metal drum 10 has its outer circumference covered by a resilient yet relatively hard rubber surface member 15. The rubber member 15 has some thickness and provides a resilient, outer circumferential surface to the drum 10. As can best be seen in FIG. 1, the rubber surface member 15 is formed with raised or radially, outwardly extending areas 16. The raised areas 16 are arranged at circumferentially spaced intervals about the circumference of the drum 10 and come in pairs with each pair being the length of a label to be applied to the drum and carried by the drum to an assembly area where the label is transferred to the article to be labeled. The particular embodiment illustrated in FIG. 1 shows four sets or pairs of raised areas 16. Each pair of raised areas will be characterized by one of the pair being a leading edge carrier and the other being a trailing edge carrier with respect to the labels.

Schematically illustrated at the lower right in FIG. 1 is a label feeding mechanism generally designated 17. The label in the form of a printed web 18 is brought from a roll supply (not shown) in the direction of the arrow 19 to pass beneath a cutting blade 20. A cooperating, rotary driven, cutting blade 21 is mounted for rotation on a support wheel 22 which is driven about its central axle 23 by means not shown. The knives will sever the label web 18 into discrete lengths of labels. As the label web 18 moves from the right as shown in FIG. 1 past the blade 20, its forward severed end passes into a vertical guide 24 which will guide the forward edge of the label web 18 into engagement with a raised area 16 of rubber member 15 of the drum 10. The label will be drawn by vacuum to the drum surface and held there by vacuum. Obviously, the web is severed at the proper time so the label will be of the correct length. Vacuum is applied through a plurality of passages which extend through the rubber member 15 of the drum, and will be described in greater detail later.

As seen in FIG. 1, once a label 25 is supported by the surface of the drum 10, it will be moved in a clockwise direction as viewed in FIG. 1, and it should be noted that the leading edge 26 of the label 25 is positioned on one of the raised areas 16 of the surface 15 of the drum 10. The trailing edge 27 of the label 25 is also held against a raised area 16 as well. As might be expected, when the label material or web 18 is made of a plastic material, such as a thin plastic film, the adhesive used to hold the web to the article or container may in fact be a solvent for the plastic, such that when applied in small amounts to the label will cause the label to become slightly tacky or at least sufficiently tacky to adhere itself to the article and to adhere to itself when in overlapping relationship about the circumference of the container or round cylindrical article.

In the present case, and as illustrated in FIG. 1 herein, a vertical adhesive applying cylinder 28 has its outer circumferential surface spaced from the surface of the drum so as to contact those portions of the labels 25 which are overlying the raised areas 16 of the drum 10. In the present case, the drum 28 is a solvent applicating, vertical cylinder and it may be of the specific configuration as shown in U.S. patent application Ser. No. 555,718. The cylinder 28 is a gravure roll which has a smooth outer surface with the exception of preselected spaced areas where the surface has a gravure texture which is designed to pick up solvent in the gravure areas and transfer the solvent from these gravure areas directly to the label surface on the raised areas as it passes in contact with the cylinder. As schematically shown in FIG. 1, and as explained in greater detail in the above-referred to patent application, the gravure cylinder 28 is provided with solvent from a vertical fountain 29 where excess solvent and any accidental buildup on the roll 28 is removed by a doctor blade 30 which is positioned in engagement with the outer circumference of the cylinder 28. The mount 33 for the cylinder 28 is pivoted about the axle 31 of a mounting post 32. It should be understood that both the cylinder 28 and the post 32 are mounted to the same base 33 which is shown in phantom line and this base 33 carries a stop block 34 which is intended to engage an adjustable stop 35 so as to set the position of the cylinder 28 relative to the outer surface of the drum 10. Thus it can be seen that labels carried by the drum 10 will have solvent applied thereto or, if the labels are paper or metal foil, the cylinder 28 may be a typical hot melt transfer roll or glue roll which would have the same essential effect in that it would apply adhesive to those areas of the label that are carried on the raised portions 16 of the drum.

It can thus be seen that the drum 10 then will carry the labels to a position designated 36. It is at the position 36 where the leading edge of a label that has either had adhesive applied thereto, or solvent in the event the label is plastic, will engage the surface of an article or container C.

The containers to be labeled enter the apparatus from the left as viewed in FIG. 1 and are successively placed on a moving conveyor 37 which is moving to the right. As viewed in FIG. 1 the containers will be positioned in an upright manner resting with their bases on the conveyor 37. Overlying the conveyor 37 near the left hand or incoming end is a first pocketed starwheel 38 which is adapted to engage the containers C as they move from left to right and upon engagement within a pocket of the starwheel 38, with the starwheel moving in a counterclockwise direction, will move the containers C along the conveyor 37 and into engagement with an arcuate guide 39. The guide 39 has a surface 40 which is curved and generally is coaxial with respect to the axis of the first starwheel 38. The containers will be brought into engagement with the label on the drum at position 36 by the movement of the starwheel and being guided by the surface 40 of the guide 39 such that it will approach the drum surface in a tangential relationship thereto. At the time the container touches the leading edge of the label, at position 36, it will be held against the surface of the drum by an arcuate outside guide 41. The guide 41 describes an arc which is coaxial with respect to the axis of the drum 10 and thus holds the container in engagement with the drum surface while at the same time, through the gear effect, the label will be wound upon the container as it is rotated by its engagement with the drum to, in effect, roll the label up onto the container. When the container has reached the position 42 in FIG. 1, the label will be completely wound about the container C and overlapped to adhere to itself. At this point in time the container will have been engaged by an exit starwheel 43 which also will be rotating in a counterclockwise direction as viewed in FIG. 1. The exit starwheel 43 will move the container to the right and position the container on the exit portion 44 of the conveyor 37. Whether the conveyor 37 extends completely across beneath the drum or whether it is interrupted adjacent the drum is immaterial since, in effect, the containers are slid from the surface of the conveyor 37 onto a deadplate 45. A smooth transition from the deadplate to the exit portion 44 of the conveyor is carried out by the starwheel 43 and an arcuate surface guide 46 which will carry the containers to the point where they will be engaged by a pair of rails 47 and 48. As best seen in FIG. 2, the illustrated container is a tall, cylindrical plastic container commonly used in the marketing of tennis balls where the balls are placed within the container and a pressure seal is applied to the top of the container. It should be understood that the container C has a substantially cylindrical outer wall to which the label 25 is to be applied.

Figure 3:
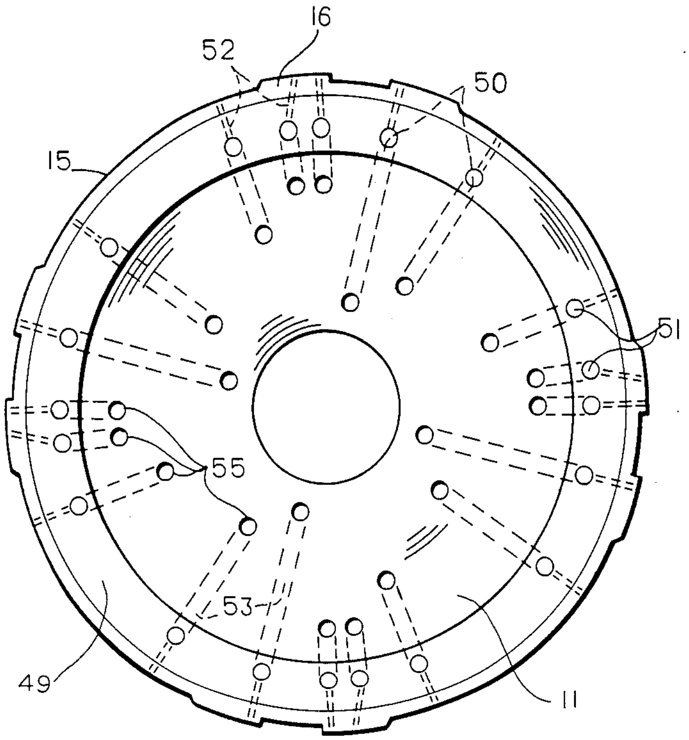
FIG. 3 is a top plan view of the vacuum transfer drum and support plate.
Figure 4:
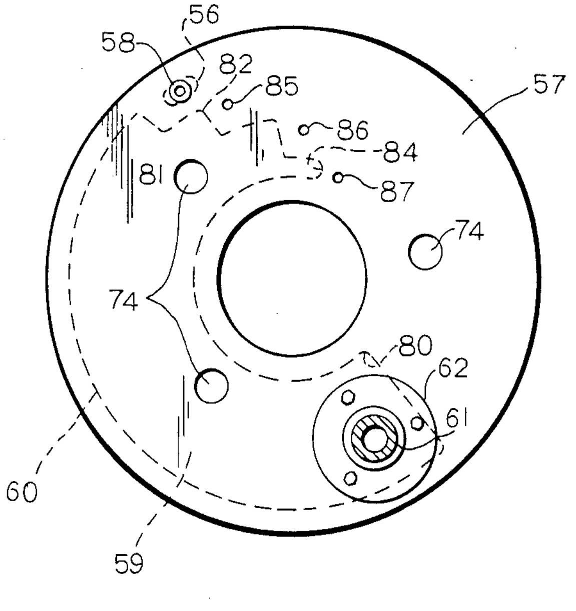
FIG. 4 is a top plan view of the vacuum chamber containing collector ring.

Turning now to FIGS. 2, 3 and 4, the detail of the vacuum drum will be given.

As previously stated, the drum 10 is essentially in the form of a right cylinder having its bottom closed by the support plate 11. The drum 10 has as its fundamental purpose the transporting of cut labels to the position 36 where they will be initially applied to the containers. As best seen in FIGS. 2 and 3, the drum 10 in its vertical wall 49 is provided with a plurality of vertical manifold passages 50. The passages 50 extend completely through from top to bottom of the wall 49. However, at the upper end thereof they are plugged with suitable plugs 51. As previously explained, the drum 10 has four sets of label holding surfaces or areas and for each set of label holding areas there are provided five manifold passages 50. Thus, as shown in FIG. 3, there are a total of 20 manifold passages 50 in the entire drum 10. Extending radially outward from each of the manifold passages 50 are vertically spaced, vacuum ports 52. As can be seen in FIG. 2, there are a plurality of vacuum ports 52 extending radially outward from each of the manifolds 50. As particularly shown in FIG. 2, there are five vertically spaced, vacuum ports which extend through the rubber surface 15 of the drum 10 and communicate at their inner ends with the manifold passage 50. As seen in FIGS. 2 and 3, the support plate 11 for the drum 10 is formed with a series of horizontal passages 53 which extend generally in a radial direction relative to the axis of the support plate 11. The passages 53 are of different lengths, depending upon the relationship they have with the trailing or leading edge of a label to be carried by the drum 10. The particular passage shown in section in FIG. 2 has an outer end 54 which extends vertically and is in alignment with the bottom end of a manifold passage 50. The inner end of the horizontal passages 53 terminates in a vertical passage 55 that in turn is in communication with an elongated, downwardly open chamber 56 in, what may be termed, a vacuum collector ring 57. As will be explained in more detail later, the elongated chamber 56 communicates with an air pipe 58 for bringing air under pressure to the chamber 56. The vacuum collector ring 57 is also formed, in its under surface in a facing relationship with respect to the support plate 11, with a relatively large vacuum chamber 59. When viewed in FIG. 4, the vacuum chamber 59 has a shape indicated by the dotted line 60. Vacuum is applied to the chamber 59 through a pipe 61 which extends through an opening in the upper surface of the collector ring 57 and is held there by a collar 62. The collector ring 57 has a diameter which is slightly less than the interior diameter of the drum 10 thus leaving a gap therebetween when assembled together as clearly shown in FIGS. 1 and 2. The collector ring 57 is held down in sealing engagement with the upper surface of the support plate 11. Positioned above the drum 10 and the collector ring 57 is a mounting or support bar 63. The bar 63 extends from above the central vertical axis of the drum 10 to a fixed support bar 64 to which it is bolted by bolts 65. It can be seen that the bolts 65 extend through an elongated slot 66 formed in the bar 63 thus providing for some radial adjustment of the bar 63 relative to the axis of the drum 10. A generally circular undercut 67 (FIG. 2) is formed adjacent the free end of the bar 63 in the under surface thereof in coaxial alignment with the vertical axis of the drum 10. A generally circular support plate 68 having an upwardly extending annular boss 69 fits within the undercut 67 of the bar 63 and thus its axis is coaxial with respect to the drum. The plate 68 carries three circumferentially spaced, downwardly extending arms 70, the lower ends of which are formed with radially outwardly extending extensions 71. Each of the three horizontal extensions 71 serves to support a threaded, bias spring holder 72. As can be seen when viewing FIGS. 1 and 2, the spring holder 72 is threaded through threaded openings in the horizontal extensions and may be vertically adjusted relative to the extensions by loosening of lock nuts 73. The lower ends of the threaded spring holders 72 extend into pockets 74 which are milled in the upper surface of the vacuum collector ring 57. The spring holders are provided with radially extending ledges 75, beneath which compression springs 76 seat, with the lower ends of the springs 76 engaging the upper surface of the ring 57. The proper amount of force to hold the vacuum collector ring 57 against the support plate 11, to eliminate vacuum loss, is obtained by adjusting the adjustable spring holder 72 down for increased spring pressure. Leakage is prevented, but if too much force is used, the drum would be hard to rotate and the ring would become worn in a short time. The arms 70 and threaded spring holders 72 also prevent the vacuum collector ring from rotating with the vacuum drum 10. The support plate 68 is bolted to the bar 63 by a pair of bolts 77 which extend through an upper clamp plate 78 overlying the bar 63 and being threaded into the circular support plate 68. The bar 63 at the area where the bolts 77 extend therethrough is provided with circumferential slots 79 so that the collector ring may be rotated for adjustment relative to the drum 10 for proper timing of the various vacuum and air portings that occur with the rotation of the drum 10 relative to the collector ring 57. As can be seen when viewing FIGS. 1 and 3, the support plate 11 has a plurality of horizontally extending passages 53 which, as previously explained, extend different lengths in the direction of the center of the drum or the axis of the plate 11. The vacuum chamber 59 in the collector ring 57 has a generally radially extending wall 80 at one end while the generally diametrically opposite end of the chamber 59 is formed with walls 81, 82, 83 and 84 which are circumferentially spaced with respect to each other as well as being limited in their radial extent by the position of the other walls of the chamber 59. As can be seen, each of the walls 81, 82, 83 and 84 correspond in their circumferential position to the vertical passages 55 formed at the inner ends of the horizontal passages 53. As long as the inner end 55 of the passages 53 are underlying the chamber 59, the vacuum will be applied to the respective manifold 50 and to the vacuum ports 52 that extend through the surface of the drum. However, when the drum has been rotated to the position shown specifically in FIGS. 1 and 2, the inner end of the vertical passage 55, which is the farthest from the center of the drum and which communicates with the raised area on the drum that holds the leading edge of the label, will have been closed from the vacuum by the wall 81 and will be positioned such that it will be open to the chamber 56 to which air under pressure is delivered by the pipe 58. It is this point in the rotation of the drum that the label is being transferred from the drum surface to the container or article C and the air pressure in chamber 56, which is applied through the ports 52, will force the label outward into engagement with the container and maintain such engagement for a finite time corresponding to the distance in the rotation of the container, since there are two vertical ports 55 that will be successively subjected to the air pressure in the chamber 56. Continued rotation of the drum relative to the collector ring 57 will bring the next succeeding passage 55 past the wall 82 and thereby cut off vacuum to the ports connected to its passage 53. Further rotation brings the next vertical passage 55 into registry with a vertical vent opening 85 which, in effect, vents this passage 55 so that any trapped vacuum is released to permit the label to be easily removed from the surface of the drum. Likewise, the next passage 55 will pass the wall 83 and become aligned with another vent port 86 and by the same token the passage 55, which connects to a horizontal passage 53 that in turn is connected to a manifold 50 that is in underlying relationship to the trailing edge of a label, will pass the wall 84 and in turn become vented at a vent opening 87.

The operation of the apparatus as set forth above is fairly straightforward; however, to provide a clear understanding and to avoid any misunderstanding, it should be understood that the labels 25 to be applied to the containers arrive in the form of a web 18 moving to the left, as viewed in FIG. 1, and are guided by guide 24 into contact with the drum surface 15. As the ports 55 of the radially extending passages 53 move past the vertical wall 80 within the vacuum chamber 59, vacuum will be applied successively to these passages and to the ports to which they extend, in effect, then holding the label to the exterior of the drum during its movement past an adhesive or solvent applying system 28 to the point 36 where the section shown in FIG. 2 is taken, at which point air under pressure will be applied to assure the smooth transfer of the leading edge of the label to the container and then as the container is held against the drum by the outside guide 41 the container will roll along and pick up the label until it becomes completely wrapped abou the container. At each of the points where the label is to leave the drum, the vacuum that is holding the label to the drum will be released and the passages vented in series as the drum rotates relative to the stationary collector ring 57. In this manner, the labels are transferred smoothly and precisely with a saving in vacuum due to the vacuum collector ring shutting off and discontinuing the supply of vacuum when the vacuum ports 52 are no longer required to hold the label. As can readily be seen, the series of ports which are at the right side of the drum, as viewed in FIG. 1, are no longer supplied with vacuum and only those ports which are active in the handling of the labels are maintained with vacuum being fed to them. Not only is the vacuum discontinued to the ports in the order in which they arrive at the point where they no longer are required, these ports are also vented to prevent any possible hangup of the label to the drum after the vacuum has been effectively cut off.

In the illustrated drum 10 in FIGS. 1 and 3, the raised areas 16, of which there are four sets or pairs, correspond to the label lengths and divide the drum surface into four label areas. There is a gap between the trailing edge of one label and the leading edge of the next label. In the total circumference of the drum, the label supporting area is about 86% while the gap is about 14%.

What is claimed is:

1. In apparatus for applying a plastic label circumferentially about a container wherein the containers are moved in a spaced apart, upright attitude into contact with the leading edge of a label carried on the surface of a label transporting drum, with the leading edge and trailing edge of said label having a solvent for the plastic applied thereto to form an adhesive and means are provided for holding the container against the label transporting means while free to rotate about its axis to wind the label on the container into overlapping, sealing relationship, the improvement in the transport drum comprising, a hollow cylindrical drum, said drum having a vertical height at least equal to the height of said label, a hard, rubberlike cover fixed to the outer surface of said drum, said cover having at least one pair of radially, outwardly extending raised areas at spaced apart intervals about the outer circumference thereof, the raised areas of each pair being spaced apart a distance corresponding to the length of the labels to be applied, a plurality of vertical vacuum passages in the cylindrical wall of said drum at spaced intervals thereabout, a plurality of vertically spaced, horizontal passages extending from each of said vertical passages in a radial direction extending outward through the outer surface of said drum, said horizontal passages adapted to underlie the labels that are held to the surface of the drum by vacuum, said horizontal passages being in circumferential sets that correspond to a label length, at least one vertical row of passages underlying the leading and trailing edge of a label held on the drum surface and at least one intermediate vertical row of passages; an annular plate fixed to the bottom of said drum and having a circumference that is sufficient to cover the lower ends of said vertical passages, a central hub supporting the plate and drum for rotation about the vertical axis of the drum, said plate being formed with radially extending, internal passages having their outer ends in communication with the vertical passages in said drum, said internal passages which connect to each set of vertical passages having a different length, with the length increasing, step-wise from the internal passage adapted to hold the leading edge of a label to the internal passage that is connected to the vertical passage which leads to the horizontal passages that underlie the trailing edge of the label, the inner ends of said internal passages connecting by vertical passages through the upper surface of said plate, a flat annular, collector ring overlying said plate in surrounding relationship to said hub, said ring being formed with a predetermined width undercut chamber in its bottom surface, said ring adapted to seat within said drum and sealingly engage the upper surface of said plate, said undercut chamber having a width sufficient to overlie the inner ends of said horizontal passages and extending with its full width from the area adjacent the label pickup point to a point just in advance of the label transfer point, a source of vacuum connected to said undercut chamber, said undercut chamber extending past the transfer point to overlie the inner ends of said horizontal passages for different degrees of rotation of said plate such that vacuum is disconnected from the internal passages in stepwise fashion beginning at the label leading edge and ending at the label trailing edge as the transport drum rotates relative to the ring, a vertical, air pressure passage extending through said ring, said air passage opening downward adjacent to the vacuum undercut chamber and adapted to overlie the leading edge internal passage at the moment of transfer of the leading edge of the label to the container to assist in the transfer, and vent openings in said ring at locations such that the other internal passages will be vented immediately after having the vacuum terminated therefrom.

2. The apparatus of claim 1 further including means for biasing said ring within said drum into firm contact with said plate.

3. The apparatus of claim 2 wherein said biasing means comprises a plurality of downwardly extending spring biased arms engaging the top of said ring.

4. The apparatus of claim 3 wherein said arms are three equispaced vertical arms carried by a single support member, a stationary overhead bar, and adjustable means for connecting said support member to said stationary overhead bar such that said support member may be angularly adjusted relative to said bar.

5. The improvement in a rotating vacuum drum for transporting labels from a pickup point where the leading edge of the label is brought into overlying relationship to a vertical series of horizontal vacuum ports in the surface of the drum and to hold the label thereon and the trailing edge of said label is likewise brought into overlying relationship to a vertical series of horizontal vacuum ports, with intermediate series of vacuum ports in said drum to hold the label thereagainst, said drum carrying the label past an adhesive application station where adhesive is applied to at least the leading edge and trailing edge of the label on its way to a label applying station where the leading edge of the label is brought into contact with a container and the container is rolled along the circumference of the drum to wind the label about the container and adhere the trailing edge to the container, the improvement in said vacuum drum comprising a circular bottom plate fixed to and closing the lower end of said hollow drum, a cylindrical hub extending through the central axis of said plate, said bottom plate having U-shaped passages formed therein with the base of said passages extending in radial directions within the plate and the vertical legs of said passages extend through the top of said plate, drive means connected to said hub for rotating said plate and drum as a unit, the most outward, vertical leg of all of said U-shaped passages lying in the same circumferential, vertical plane, and the innermost vertical legs of said U-shaped passages lying in vertical planes at different radial distances, said outward vertical legs of said passages underlying a vertical, manifold passage in said drum that connects all of the vertical series of horizontal vacuum ports in the surface of the drum and the innermost vertical legs of said passages opening through the upper surface of said drum at progressively differing radial distances with the opening which communicates with the leading edge vacuum ports being the greater distance from the axis of said drum and the opening which communicates with the trailing edge vacuum ports being the closest to the axis of the drum and stationary means positioned within said drum for applying vacuum to the openings in the upper surface of said plate that corresponds to the innermost vertical legs of said passages.

6. The improved vacuum drum of claim 5 wherein said stationary means comprises a collector ring, said ring having a vacuum chamber and air chamber therein which open downwardly and means for holding said ring in sealing engagement with the upper surface of said bottom plate.

7. The improved vacuum drum of claim 6, wherein said means for holding said ring in engagement with said bottom plate comprises a stationary plate with a plurality of circumferentially spaced vertical arms extending downward into engagement with said ring and spring means between said arms and said ring for biasing said ring downwardly.

8. The improved vacuum drum of claim 7 further including adjusting means connected to said stationary plate for permitting adjustment of said ring relative to said bottom plate.

9. In a rotatable vacuum drum for transporting labels from a pickup point, past an adhesive applicator into tangential relationship to a container and for rolling the container along its label bearing surface to apply the label about the circumference of the container, wherein the vacuum is supplied to the vacuum passages in the drum from the outer ends of radial passages in a generally circular bottom support plate for the drum with the inner ends of the passages extending upwardly into communication with a downwardly biased, overlying, stationary collector ring containing a vacuum chamber, the improvement in the means for biasing the collector ring into engagement with the bottom support plate comprising, a stationary plate, means for supporting said plate above the vertical axis of said drum, a plurality of circumferentially spaced, vertically downwardly extending spring biased arms attached to said plate, with the lower ends of said arms loosely engaging said ring.

10. The apparatus of claim 9 wherein said arms are three equispaced vertical arms carried by a single support member, a stationary overhead bar, and adjustable means for connecting said support member to said stationary overhead bar such that said support member may be angularly adjusted relative to said bar.

11. The apparatus of claim 9 wherein said arms each carry a vertically extending stud at the lower end thereof, said ring being formed with circular recesses in its upper surface for receiving the lower ends of said studs, and said spring bias is formed by a helical spring surrounding each stud, said springs being compressed between said ring and studs to thereby bias the ring against the drum support.

12. The apparatus of claim 11 further including angular adjusting means between said means for supporting said plate and said plate for angularly moving said plate, its biasing arms and said ring relative to said drum supporting bottom plate.

* * * * *